United States Patent [19]
Phillips et al.

[11] Patent Number: 5,040,641
[45] Date of Patent: Aug. 20, 1991

[54] WHEEL ASSEMBLY

[76] Inventors: Theodore D. Phillips, 706 S. Kenmore Dr.; Stephen A. Gray, 666 Southfield Dr., both of Evansville, Ind. 47715

[21] Appl. No.: 498,426

[22] Filed: Mar. 26, 1990

[51] Int. Cl.$^5$ ............................ B60B 33/00; B62B 5/04
[52] U.S. Cl. ................................... 188/1.12; 16/35 R; 188/19; 188/83; 280/33.994
[58] Field of Search ................ 188/1.12, 17, 19, 20, 188/25, 31, 60, 80, 69, 83, 262; 16/35 R; 280/33.994

[56] References Cited

U.S. PATENT DOCUMENTS

| | | | |
|---|---|---|---|
| 2,425,574 | 8/1947 | Stewack | 188/31 X |
| 2,498,626 | 2/1950 | Bivans | 188/83 X |
| 2,707,794 | 5/1955 | Kramsak | 188/1.12 X |
| 3,002,589 | 10/1961 | Cook | 188/69 |
| 3,102,580 | 9/1963 | Greegor | 188/83 X |
| 3,623,575 | 11/1971 | Joseph et al. | 188/31 |
| 3,735,838 | 5/1973 | Greenleaf | 16/35 R X |
| 3,957,144 | 5/1976 | Opyrchal | 188/83 |
| 4,110,866 | 9/1978 | Ishii | 16/35 R |
| 4,653,764 | 3/1987 | McNeill | 188/83 X |

FOREIGN PATENT DOCUMENTS 2050105  4/1972  Fed. Rep. of Germany ..... 188/1.12

*Primary Examiner*—Robert J. Oberleitner
*Assistant Examiner*—Chris Schwartz
*Attorney, Agent, or Firm*—Warren D. Flackbert

[57] ABSTRACT

A wheel assembly having particular adaptability for use on a shopping cart and which importantly serves to prevent shopping cart movement after release by the user. Briefly, the wheel assembly includes an axle, a hub, a tire carrying rim overlying said hub, and a series of lateral grooves on the outer surface of the hub and selectively engagable by, for example, spring-loaded ball catches mounted on portions of the rim. When one of the ball catches is received within a lateral groove, wheel rotation is limited (until overcome by the user's force). The preceding serves to prevent unwanted cart movement and promotes safety in a cart location area.

7 Claims, 1 Drawing Sheet

WHEEL ASSEMBLY

BACKGROUND OF THE INVENTION

As is known, wheels play a significant part of virtually countless transporting usages, where, in this instance, the wheel of the invention has particular adaptability to a common shopping cart.

The marketplace for such type of carrier is also virtually unlimited where, however, a need has arisen for preventing any free, i.e. unattended, rolling of the cart. In other words, it is desirable to have a wheel per se which is so arranged as to prevent unwanted cart movement including the random sometimes erratic path of such throughout a parking/cart area due to grade or the like and the possibility of personal injury and property damage due to free movement.

SUMMARY OF THE INVENTION

The invention accomplishes the preceding by providing a hub, suitably secured onto a wheel axle, having peripherally arranged lateral grooves which are adapted to selectively receive a tension roller catch mounted on a rotatable rim which carries the tire for the wheel. In use, the tire carrying rotatable rim is halted rotation-wise when the catch on the rim engages one of the grooves disposed around the periphery of the hub, thus stopping wheel rotation, i.e. when not overcome by cart pushing.

In other words, the invention provides a simple approach to avoid shopping cart(s) free and/or independent movement, and, therefore, serves to minimize injury to other shoppers/users of the area and damage to parked or passing vehicles.

In any event, a better understanding of the present invention will become more apparent from the following description, taken in conjunction with the accompanying drawing, wherein FIG. 1 is an isometric view, partly broken and partly in section, showing a wheel assembly in accordance with the teachings of the present invention;

Figure 3:
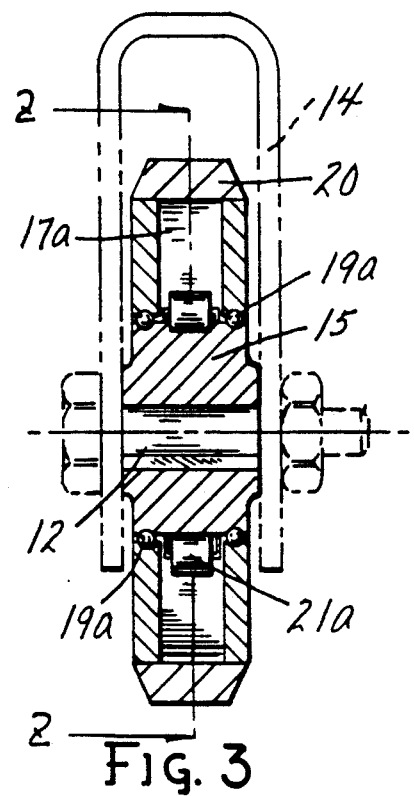
FIG. 3 is a view in vertical section of the wheel assembly in FIG. 1, further detailing such and taken at line 3—3 on FIG. 2 and looking in the direction of the arrows; and, FIG. 4 is a fragmentary view showing the instant wheel assembly in a use condition on a shopping cart.

For the purposes of promoting an understanding of the principals of the invention, reference will now be made to the embodiment illustrated in the drawing and specific language will be used to describe the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF A PREFERRED EMBODIMENT

Figure 4:
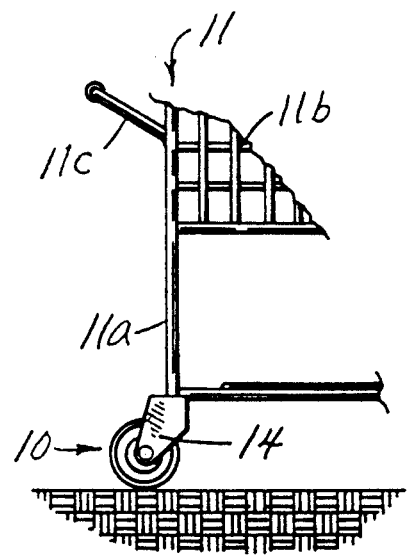

Referring now to the figures, and first to FIG. 4, the wheel assembly 10 of the invention is typically shown in a use condition on the rear wheels of a shopping cart 11 including a framework 11a, a goods receiving basket 11b and a push handle 11c. The wheel assembly 10 is typically, and commonly, mounted on an axle 12 (see FIG. 3) extending through a downwardly depending saddle 14 (also shown in phantom in FIG. 3) affixed to the lower part of the framework 11a.

Figure 2:
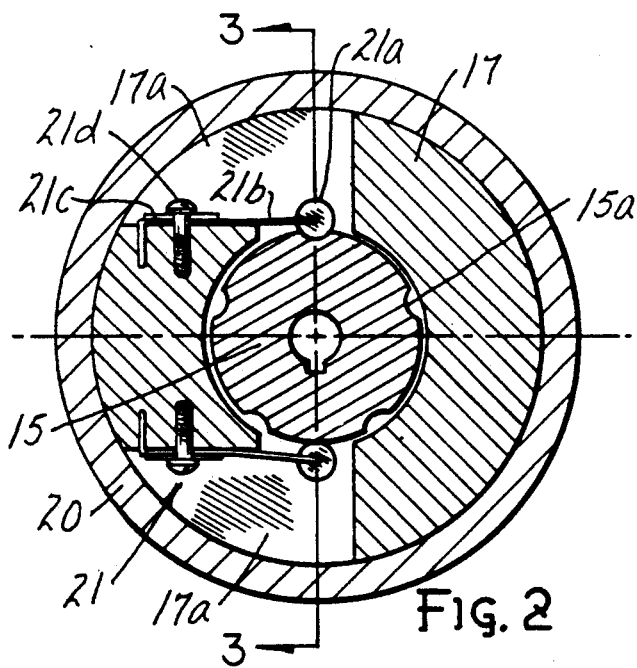
FIG. 2 is a view in side elevation, detailing the invention, taken at line 2—2 on FIG. 3 and looking in the direction of the arrows.

The wheel assembly 10 of the invention includes a hub 15 having keyway 15' mounted on axle 12, where hub 15 includes a series of spaced apart lateral grooves 15a arranged around the outer surface thereof (FIG. 2). The hub 15 rotatably mounts a rim 17, the latter presenting cut-out portions 17a in the mid-region thereof (FIGS. 2 and 3). Typically, the hub 15 and the rim 17 are fabricated from a plastic resin.

Figure 1:
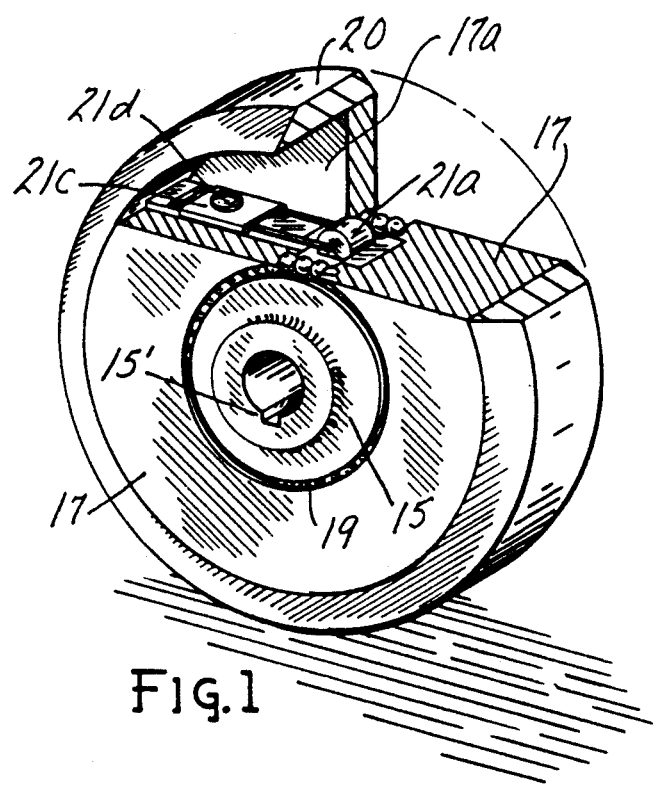

As is further evident in FIGS. 1, 2 and 3, raceways 19, presenting contiguous ball bearings 19a, are arranged on opposite sides of the wheel assembly 10 and provide for the rotary movement of the rim 17 on the hub 15. A tire 20, either rubber or any other preselected material, is arranged on the outer surface of the rim 17 (see FIGS. 1 and 2).

Looking again at FIGS. 1, 2 and 3, and particularly FIG. 2, each of the cut-out portions 17a contains a spring loaded ball catch assembly 21 defined by a ball catch 21a (right circular cylindrical in form), a spring metal support 21b mounting the ball catch 21a and extending between a plate member 21c through which a screw or like threaded means 21d extends into a wall thereof.

As illustrated in FIG. 2, each ball catch 21a is adapted to roll on the outer surface of the hub 15 and selectively engage one of the lateral grooves 15a thereon. In typical invention form, and while lateral grooves 15a are 60° apart, each ball catch 21a (although oppositely disposed) is arranged so that when one ball catch 21a is received within a lateral groove 15a, the other ball catch 21a is resting on the outer surface of the hub 15 between lateral grooves 15a. The reasoning is to achieve wheel stopping in a minimal travel path.

During use, and upon movement of the shopping cart, axle 12, hub 15, rim 17, and tire 20 comprising the wheel assembly 10 all rotate in a desired direction, depending upon the operator's intentions.

When the shopping cart is released, and assuming an incline and, hence, cart movement caused by gravity, the cart moves only to the next lateral groove 15a, where no further rotation of wheel 10 can be achieved due to ball catch 21a. In other words, the invention serves wheel assembly 10 rotational stopping purposes, preventing any unwanted shopping cart movement after release (or further pushing) by the user.

The wheel assembly described hereabove is susceptible to various changes within the spirit of the invention, including, by way of example, in proportioning; material selection; the manner of spring loading for catch securement; the spacing of the lateral grooves; the manner of securing the hub onto the axle; and, the like.

Thus, the preceding description should be considered illustrative and not as limiting the scope of the following claims.

We claim:

1. A wheel assembly used in combination with an axle comprising a hub overlying said axle, a rim overlying said hub, a tire mounted on said rim, said hub having lateral grooves disposed around the outer surface thereof, said rim having a centrally disposed cut-out portion, and leafspring latching means which continually bias said hub disposed within said centrally disposed cut-out portion intermittently and automatically engaging one of said lateral grooves in a wheel retarding relationship selectively overcome by continued wheel rotation.

2. The wheel assembly of claim 1 where said latching means is a ball catch.

3. The wheel assembly of claim 1 where ball bearings are disposed between said rim and said hub.

4. The wheel assembly of claim 1 where said spring-loaded latching means travels along a path located in the mid-area of said outer surface of said hub.

5. The wheel assembly of claim 1 where another of said latching means remains in engagement with said outer surface of said hub between other of said lateral grooves.

6. The wheel assembly of claim 1 where said rim is rotatable on said hub.

7. The wheel assembly of claim 1 where means secure said axle to said hub.

* * * * *